United States Patent
Patodia et al.

(10) Patent No.: US 12,136,044 B2
(45) Date of Patent: Nov. 5, 2024

(54) DYNAMIC DETERMINATION OF DATA LOAD PROCESS FOR A RULE ENGINE IN A DECISION SERVICE

(71) Applicant: PayPal, Inc., San Jose, CA (US)

(72) Inventors: Prabin Patodia, Bangalore (IN); Shikha Gupta, Bangalore (IN)

(73) Assignee: PayPal, Inc., San Jose, CA (US)

( * ) Notice: Subject to any disclaimer, the term of this patent is extended or adjusted under 35 U.S.C. 154(b) by 828 days.

(21) Appl. No.: 17/089,318

(22) Filed: Nov. 4, 2020

(65) Prior Publication Data

US 2021/0357770 A1 Nov. 18, 2021

(30) Foreign Application Priority Data

May 13, 2020 (IN) .............................. 202041020232

(51) Int. Cl.
 *G06N 5/025* (2023.01)
 *G06F 16/2455* (2019.01)
 *G06N 5/022* (2023.01)
 *G06Q 20/40* (2012.01)

(52) U.S. Cl.
 CPC ....... *G06N 5/025* (2013.01); *G06F 16/24564* (2019.01); *G06N 5/022* (2013.01); *G06Q 20/405* (2013.01)

(58) Field of Classification Search
 CPC .. G06N 5/025; G06N 5/022; G06F 16/24564; G06Q 20/405
 See application file for complete search history.

(56) References Cited

U.S. PATENT DOCUMENTS

| | | | | |
|---|---|---|---|---|
| 9,426,215 | B2* | 8/2016 | Mason | H04L 67/1029 |
| 2003/0135453 | A1* | 7/2003 | Caulfield | G06Q 20/403 |
| | | | | 705/38 |
| 2003/0195803 | A1* | 10/2003 | Ketonen | G06Q 10/10 |
| | | | | 705/14.39 |
| 2005/0027651 | A1* | 2/2005 | DeVault | G06Q 20/10 |
| | | | | 705/38 |
| 2012/0227044 | A1* | 9/2012 | Arumugham | G06Q 10/06 |
| | | | | 718/100 |
| 2014/0089037 | A1* | 3/2014 | Bhatnagar | G06Q 10/10 |
| | | | | 705/7.27 |

(Continued)

*Primary Examiner* — Jason B Dunham
*Assistant Examiner* — Huma Waseem
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to dynamically determining a data load process usable with a decision service for responding to requests to the decision service. The data load process may be selected from either a full data load process that loads data needed for all the rules in the decision service, or a selective data load process that loads data needed for a subset of the rules in the decision service according to embodiments. The decision service may determine the data load process to implement based on an evaluation of a decision blueprint in response to receiving the request, where the decision blueprint includes a set of rules interconnected by flow paths. Evaluation of properties of the rules and flow paths based on input data in the request may be used to determine the data load process to implement. Overall, this results in faster execution times in various circumstances.

20 Claims, 8 Drawing Sheets

(56) References Cited

U.S. PATENT DOCUMENTS

| | | | |
|---|---|---|---|
| 2014/0279838 A1* | 9/2014 | Tsirogiannis | G06F 16/22 |
| | | | 707/603 |
| 2016/0144572 A1* | 5/2016 | Elmieh | G06F 30/00 |
| | | | 700/98 |
| 2016/0371603 A1* | 12/2016 | A V | G06N 20/00 |
| 2018/0239690 A1* | 8/2018 | Balestrazzi | G06F 11/366 |
| 2019/0005421 A1* | 1/2019 | Hammel | G06Q 10/06393 |
| 2019/0114702 A1* | 4/2019 | Nicholson | G06Q 20/4014 |
| 2019/0199657 A1* | 6/2019 | Fawcett | G06Q 10/1097 |
| 2020/0175561 A1* | 6/2020 | Leung | G06Q 30/0609 |
| 2021/0004711 A1* | 1/2021 | Gupta | G06N 5/02 |
| 2021/0110394 A1* | 4/2021 | Chen | G06Q 20/105 |
| 2023/0185620 A1* | 6/2023 | Nagasaki | G06F 9/5038 |
| | | | 718/104 |

* cited by examiner

DYNAMIC DETERMINATION OF DATA LOAD PROCESS FOR A RULE ENGINE IN A DECISION SERVICE

PRIORITY CLAIM

The present application claims priority to Indian Patent Appl. No. 202041020232, filed May 13, 2020, the disclosure of which is incorporated by referenced herein in its entirety.

BACKGROUND

Technical Field

This disclosure relates generally to dynamically determining a data load process for a rule engine as may be used in a decision service, in order to load data for rules implemented by the rule engine, according to various embodiments.

Description of the Related Art

Decision services may be used to automate decision-making tasks using rule-based solutions. When a decision service is requested to make a decision, the decision service may apply sets of rules (with various requirements) to input data for the request in an organized manner. This allows a rule engine to determine the decision based on that input data.

In response to receiving a request, a decision service may load data corresponding to rules in the rule engine from a data store. The loaded data is needed in order to evaluate the rules applicable to the request and to determine a decision for the request. In many rule engines, the number of rules and organizational paths (e.g., flow paths) for the rules can be very complex, with combinations of rules and organizational paths that number in the hundreds, thousands, or many more. With such complexity, loading the data needed to apply the rules in the decision service can be a processing and memory intensive task. Especially when rapid execution of one or more rules is needed in order to reach a decision with a time constraint, Applicant recognizes that improved data loading for rule engines is desirable to reduce execution times and improve system operation.

BRIEF DESCRIPTION OF THE DRAWINGS

The following detailed description makes reference to the accompanying drawings, which are now briefly described.

Figure 1:
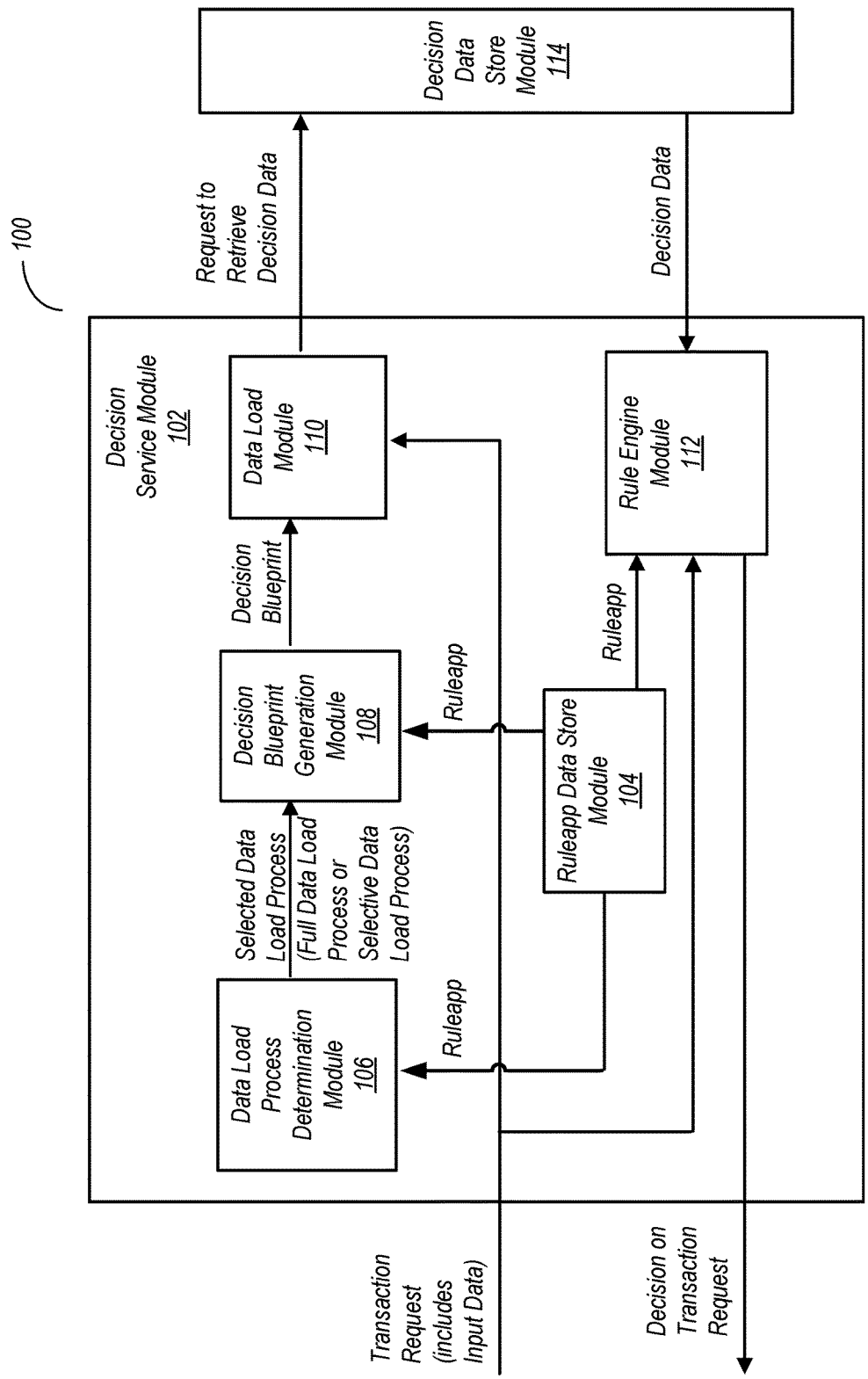
FIG. 1 is a block diagram of a transaction system, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(*f*) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to determining a data load process for a decision service to implement when loading data corresponding to rules into a rule engine in the decision service in order to determine a decision on a request to the decision service. As used herein, a "decision service" includes a service that implements a ruleapp using a rule engine to provide an automated decision in response to receiving a request for a decision. A "ruleapp" includes a collection or set of rules that are connected and organized under different flow paths. The set of rules in the ruleapp may be interconnected and organized by flow paths based on policies, constraints, or required operations in the rules (described below). The interconnection of the rules may include, for example, a flow of the rules where rule 1 flows into either rule 2 or rule 3, which flows into rule 4, rule 5, or rule 6 depending on the evaluation of the rules. In some instances, rules may be organized based on data dependency (e.g., rule 1 and rule 2 both require the same data to be loaded). A "rule engine" is a component of a decision service (such as a software component) that evaluates and executes the rules to determine a decision.

As used herein, a "rule" includes a policy, constraint, or required operation that applies to a specific set of conditions. For example, a rule may execute a policy, execute a decision, or determine new data based on input data in the request. As used herein, a "condition" describes a situation or state that must be in place for a specific action to occur. In decision services, conditions are generally evaluated as being true or false. In some instances, conditions, such as flow path conditions, may be evaluated as true, false, or cannot be determined based on the information or data available at the time the evaluation is made. Generally, conditions associated with a rule are evaluated before a rule is executed. As user herein, a "flow path" includes a path that provides a controlled order for rules to be completed, which is designed according to policies, constraints, or requirements associated with the rules. Different flow paths may intersect at a rule as one rule may be part of multiple flow paths. For example, a business rule that applies different transaction limits to a transaction request based on where a user is located may be part of both a first flow path associated with a first payment type and a second flow path associated with a second payment type.

The term "decision data" is used herein to refer to data corresponding to a rule in a decision service that is loaded into a rule engine. In the context of decision services, "decision data" includes data that a rule engine needs in order to execute the rules and apply the rules to input data in a request to a decision service. For example, a business rule may apply different transaction limits to a transaction request based on where a user is located. The input data in the transaction request may include data for an amount of the transaction request. In order to execute the rule, the rule engine needs decision data that includes information on where the user is located. The decision data, which includes the user's location, may be loaded from a data store of user information in response to the transaction request. The rule, when executed, may then apply a transaction limit on the transaction request based on the user's location loaded in the decision data. A decision on the transaction request may then be determined by the rule engine based on the amount of the transaction request and the applied transaction limit (though it may be understood that additional rules may be applied before a decision on the transaction request is determined by the rule engine).

In certain instances, decision services are implemented to provide computing decisions such as making transaction-related decisions for transaction systems. Such decisions that may be based on rules include, but are not limited to, risk decisions (e.g., whether a payment transaction will fail), compliance decisions (e.g., whether a transaction meets regulatory guidelines), and limit decisions (e.g., whether an amount of a transaction is within allowable limits). In some instances, decision services may provide decisions with conditions placed on the decisions. For example, a decision server for a transaction system may approve a transaction as long as an additional parameter is met by the requester of the transaction.

Some decision services may be referred to as "smart" decisions services. Smart decision services may create a decision blueprint of a ruleapp. As used herein, a "decision blueprint" or "blueprint" includes a set of data that describes the connection and organization of the set of rules and flow paths in the ruleapp. For example, a decision blueprint may include a set of data that describes the rules and how the rules are interconnected by the different flow paths to generate a decision. In some embodiments, a decision blueprint includes metadata that describes all possible flow paths for the set of rules, the rules associated with each flow path, and conditions that need to be evaluated for each flow path.

Figure 3:
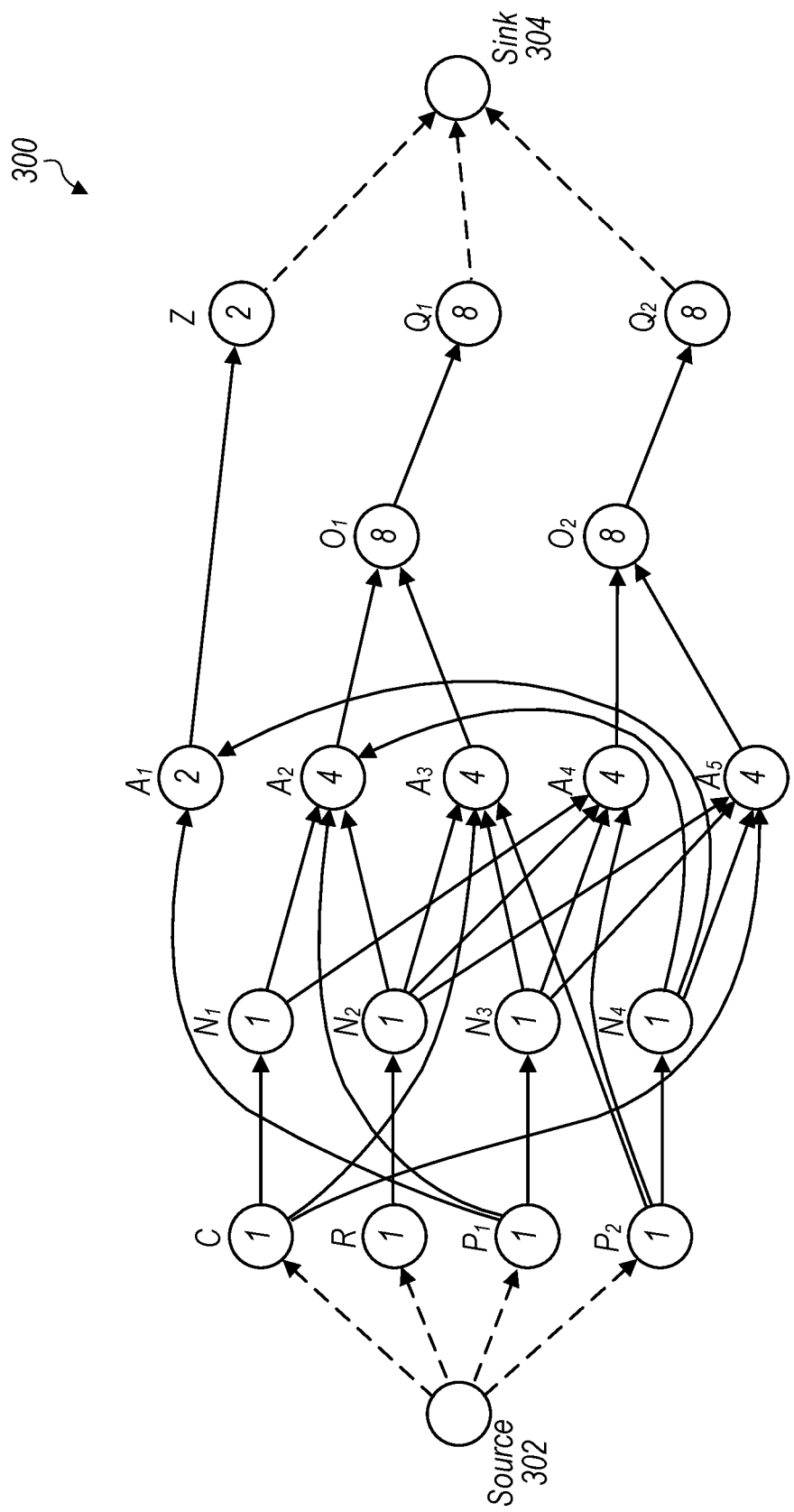
FIG. 3 depicts an example of a visualization of a decision blueprint, according to some embodiments.

A decision blueprint for a smart decision service may be visually represented by a flow chart or diagram that displays a set of rules interconnected and organized according to the possible flow paths (an example of a visualization of a decision blueprint according to some embodiments is shown in FIG. 3). A flow chart may visualize a representation of all the possible flow paths interconnected by nodes in a tree-like structure between a source (input) and a sink (output). Each node in the tree-like structure may include conditions that, when applied, further branches into various possible outcomes at the next level. For example, nodes may have conditions that need to be satisfied for each of the flow paths progressing from the node. These conditions may relate to one or more data items, e.g., if the value of variable X is greater than 0.55, the flow path proceeds in one direction, or if not, the flow path proceeds in another. There may be multiple possible flow paths that diverge from each of the nodes. Each of the flow paths diverging from nodes shown in the decision blueprint may have rules associated with the flow path that are executed upon satisfying conditions at the nodes.

For a smart decision service, the decision blueprint is generated by the decision service and gets stored in memory according to various embodiments. The decision blueprint is then accessed when a decision request (e.g., a transaction decision request) is made to the decision service. When the request is received, the decision service needs to load decision data for the rules to be executed and to make the decision. For many smart decision services, the decision blueprint may be evaluated to reduce the data load beyond needing to load decision data for all rules in the decision blueprint. Evaluation of the decision blueprint may include evaluating the input data in the request against conditions (e.g., nodes) for all of the possible flow paths based on the data in the decision blueprint. Evaluation of the conditions determines which flow paths are possible flow paths based on the input data in the request. Possible flow paths include flow paths that satisfy the conditions or the flow paths with conditions that cannot be evaluated based on the received data. Flow paths that do not satisfy the conditions may be flagged and removed from consideration. Accordingly, the data load process may load the decision data from the data store only for the rules in flow paths that satisfy the conditions or for the rules in flow paths that cannot be evaluated based on the data available. Any rules that are only found in the flow paths removed from consideration do not have be included in the data load. This data load process can thus be considered a "selective" data load process.

For complex decision services, the number of rules and generated flow paths may be in the range of hundreds to millions. In certain use cases, reducing the number of rules for which data is loaded (by using evaluation of conditions and implementing a selective data load process) may significantly reduce time consumption for the data load process, processing power, and memory usage versus loading the data for all rules (e.g., a full data load process, as described herein). There are, however, use cases where a full data load process may be more efficient in time consumption, processing power, or memory usage than a selective data load process. For example, in use cases where the possible combination of generated flow paths is large (e.g., in the range of $10^5$ to $10^8$) and the number of rules is lesser (e.g., in the range of $10^3$ to $10^5$), a full data load process that does not involve flow path generation or evaluation may be more efficient. In such cases, generating and storing a decision blueprint with such a large number of flow paths, as needed for a selective data load process, may take a huge amount of time, processing power, and memory usage with the possibility that the system operating the decision service does not have enough resources (e.g., enough processing power or available memory). Additionally, when a decision request is made to the decision service, evaluating each condition for all the possible flow paths (e.g., $10^5$ to $10^8$ condition evaluations) becomes more cumbersome than the data load itself, which may indicate a full data load process is more efficient than a selective data load process in such cases. Examples of where a selective data load process is more efficient and where a full data load process is more efficient are disclosed herein.

The present disclosure contemplates various techniques for determining a type of data load process to be performed in response to a request to a decision service—that is, whether the data load process will be a full data load process or a selective data load process. This determination can be said to be "dynamic" in that the determination of the type of data load process to be performed is made when analyzing content of the decision blueprint that is generated by assessment of the ruleapp being used by the decision service as opposed to being predetermined for the decision service.

One embodiment described herein has three broad components: 1) determining whether a full data load process or a selective data load process is to be used to load decision data for rules in the ruleapp based on properties of the rules and flow paths in the ruleapp, 2) generating a blueprint for the ruleapp where the blueprint includes information for loading the decision data for the rules according to the determined data load process, and 3) loading the decision data from a data store according to the blueprint. In some embodiments described herein, the determination of whether the full data load process or the selective data load process is to be used is based on evaluation of the properties of the rules and flow paths in the ruleapp and a threshold set by the decision service owner. Properties for the rules that may be included in the information in the decision blueprint include, but are not limited to, number of rules in the ruleapp, total count of unique data loads needed for the set of rules, time needed for the data load of each rule, and total time needed for the data load of the set of rules (total time to load all the rules). Properties for the flow paths that may be included in the information in the decision blueprint include, but are not limited to, total number of possible flow paths, average complexity of each flow path, total time needed for evaluating conditions of all flow paths, and total storage memory required for the one or more flow paths. In some embodiments, evaluation of the properties of the computer system operating the decision service may be included in the determination of the load process to be utilized.

In various embodiments, a comparison between one or more properties of the rules and flow paths is used to determine whether a full data load process or a selective data load process is to be used to load decision data for rules in the ruleapp. In some embodiments, a value of a property, or value determined from a combination of properties, is compared to the threshold value to determine whether a full data load process or a selective data load process is to be used to load decision data for rules in the ruleapp. After the data load process is determined, a decision blueprint may be generated that includes information for loading the decision data according to the determined data load process. The decision service may then load the decision data according to the decision blueprint in response to receiving a request for a decision. With the decision data loaded, the decision service may output a decision by executing the rules in the ruleapp on input data in the request.

In short, the present inventors have recognized that there is no "one size fits all" approach for loading data for a decision service, and that determining what is the appropriate decision data load process depends on a variety of factors. This approach advantageously allows the decision service to determine, for each individual ruleapp implemented in the decision service, the decision data load process that will provide better utilization of resources. For example, the determined decision data load process may have a reduced time for the data load, use less processing power for the data load, or utilize less memory for the data load. Dynamically determining a selected data load process and automatically implementing the selected data load process may thus provide a better service-level agreement (SLA) between the decision service and a data center.

FIG. 1 is a block diagram of a transaction system, according to some embodiments. As used herein, the term "transaction system" refers to any computer system that implements a service in which two or more parties use computer systems to exchange information. Accordingly, a "transaction service" according to this disclosure may include a payment service (e.g., PAYPAL), a social network, a file transfer service, an online retailer, a dating site, and so on. Note that generally, this disclosure may include various examples and discussion of techniques and structures within the context of a "transaction system". Note that all these examples, techniques, and structures may be generally applicable to any online system that provides a decision service. For example, transaction system 100 may be any online system in some instances. However, the term transaction system is used for ease of understanding in various portions of this disclosure.

In the embodiment shown in FIG. 1, transaction system 100 includes decision service module 102. Decision service module 102, as with other modules described herein, may be implemented as stored executable computer instructions. Decision service module 102 includes ruleapp data store module 104, data load process determination module 106, decision blueprint generation module 108, data load module 110, and rule engine module 112. In certain embodiments, ruleapps are accessed by decision service module 102 from a ruleapp service (e.g., a ruleapp author or designer) and stored in ruleapp data store module 104. Ruleapps in ruleapp data store module 104 may include a set of rules received from one or more logical entities associated with transaction system 100. For example, the set of rules may be designed by policy writers associated with transaction system 100.

In some embodiments, ruleapp data store module 104 is located in decision service module 102. In some embodiments, ruleapp data store module 104 is located elsewhere and coupled to decision service module 102. In certain embodiments, data load process determination module 106 accesses a ruleapp from ruleapp data store module 104. As described herein, the ruleapp may also be accessed by rule engine module 112 for execution of the rules. In some embodiments, the ruleapp is accessed at a time the ruleapp is received by decision service module 102.

In certain embodiments, data load process determination module 106 accesses data corresponding to rules and flow paths in the ruleapp when accessing the ruleapp. Data load process determination module 106 may determine a decision data load process to be implemented in a decision blueprint generated by decision blueprint generation module 108. At a time of a transaction request, data load module 110 may access the decision blueprint from decision blueprint generation module 108 to determine decision data to retrieve from decision data store module 114 according to the decision blueprint. In some embodiments, the decision blueprint is accessed by data load module 110 to determine a subset of decision data to be loaded according to a selective data load process, as described herein. Rule engine module 112 may receive the decision data from decision data store module 114 in response to the request from data load module 110 and execute rules in the ruleapp (accessed from ruleapp data store module 104) using the loaded decision data to output a decision on the transaction request.

Transaction requests, as described herein, may include, but not be limited to, requests to complete a transaction or requests for other transaction-related decisions such as risk decision requests, compliance decision requests, and limit decision requests. While embodiments described herein relate to transaction requests, other embodiments may be contemplated for other decision requests for which decision services can render decisions. In certain embodiments, the transaction request includes input data in the request. Input data may include data associated with the request along with other data loaded by decision service module 102. Input data is used by rule engine module 112 to determine a decision on the request. In some embodiments, decision service module 102 provides the input data to data load module 110 for determining a subset of decision data to be loaded according to a selected data load process, as described herein.

Figure 2:
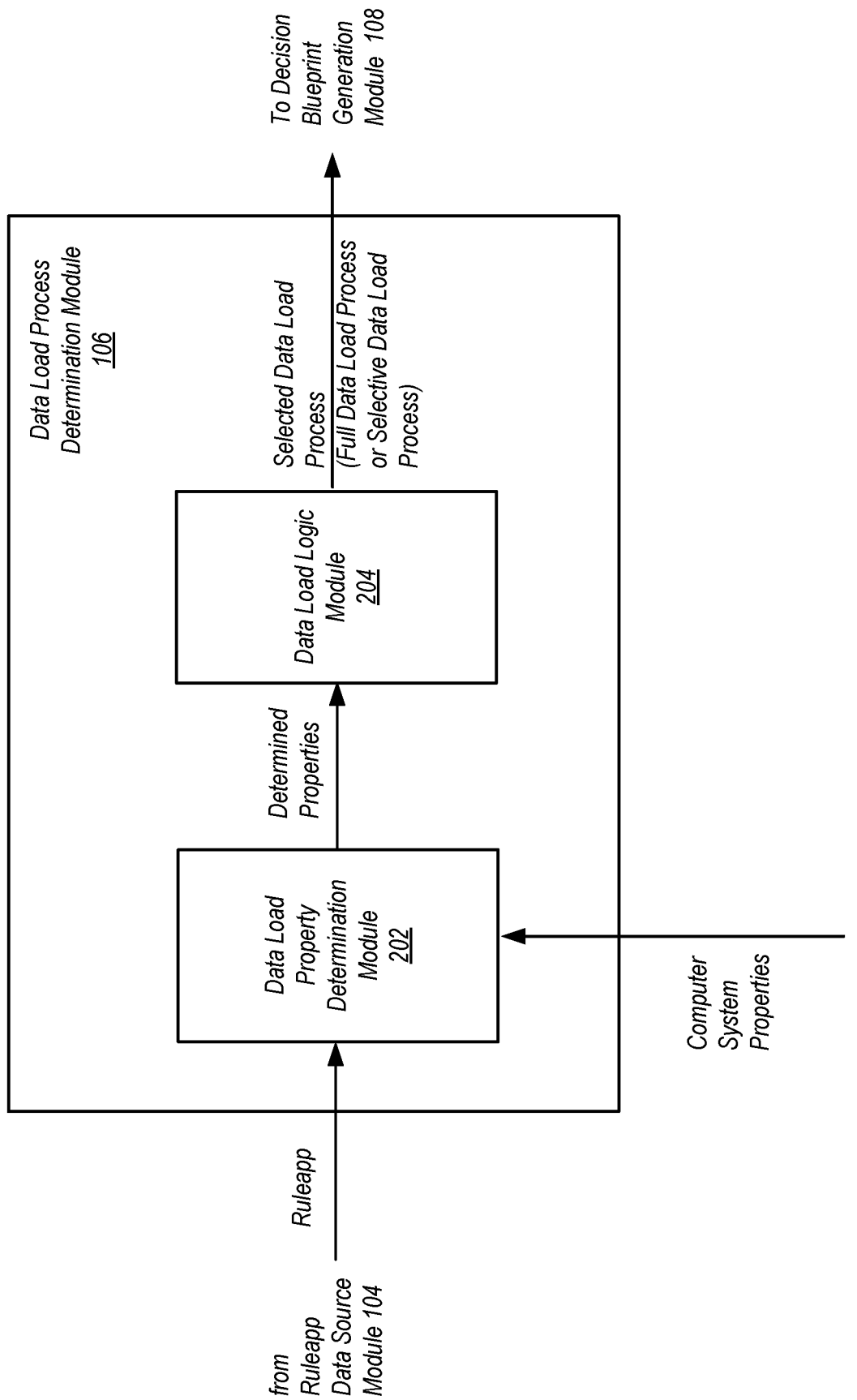
FIG. 2 depicts a block diagram of a data load process determination module, according to some embodiments.

As shown in FIG. 1, data load process determination module 106 accesses the ruleapp and data corresponding to rules and flow paths in the ruleapp. In certain embodiments, data load process determination module 106 accesses the ruleapp to determine a decision data load process to be implemented by data load module 110 in response to a transaction request. FIG. 2 depicts a block diagram of data load process determination module 106, according to some embodiments. Data load process determination module 106 includes data load property determination module 202 and data load logic module 204.

In certain embodiments, data load property determination module 202 accesses data that describes rules and flow paths in the ruleapp. Based on data describing the rules and flow paths in the ruleapp, data load property determination module 202 may determine properties of rules and flow paths for the ruleapp. Properties of rules may include, but not be limited to, total number of rules in the ruleapp, total count of unique data loads needed for all the rules in the ruleapp, and time needed for decision data load for each rule in the ruleapp. Properties of flow paths for a transaction request may include, but not be limited to, total number of possible flow paths, average complexity of each flow path (e.g., average processing time for conditional evaluation of each flow path), total time needed for conditional evaluation of all flow paths, and total storage memory required for the flow paths.

In some embodiments, properties based on a combination of data for rules and flow paths are determined by data load property determination module 202. For example, a determined property may include a total time needed for decision data load for rules in each of the possible flow paths. From the total time needed for decision data load for each flow path, an additional property may be determined for each flow path that includes time needed for load of decision data not included in the flow path.

In some embodiments, properties of the computer system (e.g., a computer system operating decision service module 102) are retrieved by data load property determination module 202. Properties of the computer system may be used by data load property determination module 202 to determine properties associated with rules and flow paths in the ruleapp. For example, properties of the computer system may be used to determine load times, processing times, or storage needs for rules and flow paths. Properties of the computer system may include, for example, memory available in computer system, operating speed of the computer system, communication speed of the computer system, and communication speed of the computer system to external systems (such as an external data store). In some embodiments, as described below, properties of the computer system are used in combination with properties of rules and flow paths to determine a decision data load process to be implemented.

As shown in FIG. 2, the properties determined by data load property determination module 202 are provided to data load logic module 204. In certain embodiments, data load logic module 204 determines a selected (decision) data load process based on the received properties (e.g., whether a full data load process or a selective data load process is to be implemented) and outputs the selected data load process to decision blueprint generation module 108.

In some embodiments, data load logic module 204 implements comparisons to determine a selected data load process for output from the module. For example, in one embodiment, a comparison between a first property and a second property may be used to determine a selected data load process. The comparison may include comparing the first property to the second property to determine whether the first property satisfies a selected relationship compared to the second property (e.g., whether the first property satisfies a logical or mathematical relationship between the first property and the second property). In this example, if the first property satisfies the selected relationship, then the selected data load process may be a first data load process (e.g., a full data load process). Conversely, if the first property does not satisfy the selected relationship, then the selected data load process may be a second data load process (e.g., a selective data load process).

While the above example describes satisfying a relationship between two properties, relationships between larger numbers of properties may be assessed to determine a selected data load process. For example, a comparison may include multiple "if" statements (e.g., multiple relationships to satisfy) for determining a selected data load process where each "if" statement compares different properties. In some embodiments, comparisons include a flow of "if" statements and "elseif" statements to determine a selected data load process. As one specific example, a sample comparison may be:

If (number of flow paths>xx times number of rules) [where xx>1];
else if (total time for a selected flow path condition check>time taken to load data not needed for the selected flow path);
else if (memory usage of flow paths>yy % of memory available in system) [where yy is <100].

In the sample comparison above, "xx" and "yy" are predetermined values. If any of the above "if" statements is satisfied, then a first data load process (e.g., a full data load process) is selected. If none of the "if" statements are satisfied, then a second data load process (e.g., a selective data load process) is selected. Accordingly, various criteria may be specified that determine whether a full data load or a selective data load is used for rule execution.

In certain embodiments, a comparison includes comparison of one or more properties to a threshold provided to data load logic module 204. In some embodiments, the thresholds are determined by an owner of decision service module 102. Allowing the thresholds to be determined by the decision service owner allows the determination of the selected data load process to be customized for each specific decision service. For example, the decision service owner may customize thresholds based on best or desired practices determined by the decision service owner.

Thresholds may include, as an example, the predetermined values "xx" and "yy" in the above sample comparison. It is contemplated herein that thresholds may be applied in any manner suitable for making a determination based on one or multiple properties for rules, flow paths, or computer systems, as described herein. For example, in some embodiments, a single property for rules or flow paths may be compared to a single threshold value to determine a selected data load process. In other embodiments, multiple properties for rules or flow paths may be combined into a single value that is compared to a single threshold value. In yet other embodiments, multiple properties for rules or flow paths may be compared to multiple thresholds (such as using multiple "if" statements as in the example above).

While the present disclosure describes various embodiments for determining a selected data load process based on properties for rules, flow paths, or computer systems, additional embodiments for determining a selected data load process may be contemplated based on the description herein. Such additional embodiments may include, for example, additional comparisons or other logical calculations utilizing these properties based on the description herein.

Returning to FIG. 1, the selected (decision) data load process is provided by data load process determination module 106 to decision blueprint generation module 108. In response to receiving the selected data load process, decision blueprint generation module 108 may access the ruleapp corresponding to the selected data load process from ruleapp data store module 104. In some embodiments, the ruleapp may be provided by data load process determination module 106 along with the selected data load process.

Decision blueprint generation module 108 may generate a decision blueprint for the ruleapp according to the selected data load process. The decision blueprint may be provided to data load module 110. Data load module 110 may utilize the decision blueprint to determine decision data to be loaded from decision data store module 114 in response to a transaction request received by decision service module 102.

In certain embodiments, the decision blueprint generated by decision blueprint generation module 108 includes information for accessing decision data for rules in the ruleapp according to the selected data load process. In embodiments where a full data load process is the selected data load process, the decision blueprint generated by decision blueprint generation module 108 may include information for accessing decision data from decision data store module 114 for all of the rules in the ruleapp. In such embodiments, the information in the decision blueprint includes, for example, a listing or other description of decision data loads needed for all the rules in the ruleapp.

In embodiments where a selective data load process is the selected data load process, the decision blueprint generated by decision blueprint generation module 108 may include information describing each possible flow path in the ruleapp, conditions for evaluation of each flow path, rules associated with each flow path, and decision data associated with each rule. In such embodiments, data load module 110 may determine a subset of decision data to load from decision data store module 114 by evaluating the decision blueprint according to input data in the transaction request, as described herein. In some embodiments, information in the decision blueprint includes metadata describing details of a ruleapp. The metadata may include be, for example, metadata that describes all possible flow paths for the set of rules, the rules associated with each flow path, and conditions (that need to be evaluated for each flow path.

Examples of Decision Blueprints for Selective Data Load Process

As described above, a decision blueprint for a selective data load process may be visualized as a flow chart or diagram that displays the set of rules interconnected and organized according to the possible flow paths. FIG. 3 depicts an example of a visualization of a decision blueprint for a selective data load process, according to some embodiments. Decision blueprint visualization 300 is an example of a visualization of a decision blueprint that includes a plurality of circles interconnected by arrows between source 302 and sink 304.

The circles in FIG. 3 represent locations where decision data needs to be loaded to execute rules. The letters above the circles represent conditions associated with the flow paths that are evaluated to control branching from the flow nodes. The numbers inside the circles represent values of data load time (e.g., 1=1 ms) for loading decision data corresponding to the circles. The arrows represent flow paths between the circles. As shown in the example of FIG. 3, multiple flow paths (arrows) can branch and interconnect the rules (circles) in decision blueprint visualization 300. It is to be understood that FIG. 3 is non-limiting, and that many different techniques for visualizing a decision blueprint may be contemplated.

In certain embodiments, the circles directly connected to source 302 (e.g., the four circles labeled with C, R, $P_1$, $P_2$ and connected to the source with dashed arrows) are initial conditions for each of the four flow paths originating at the source. A conditional evaluation of the conditions associated with these four circles based on the input data provided at source 302 may be used to determine a selective data load process, as described herein.

Figure 4:
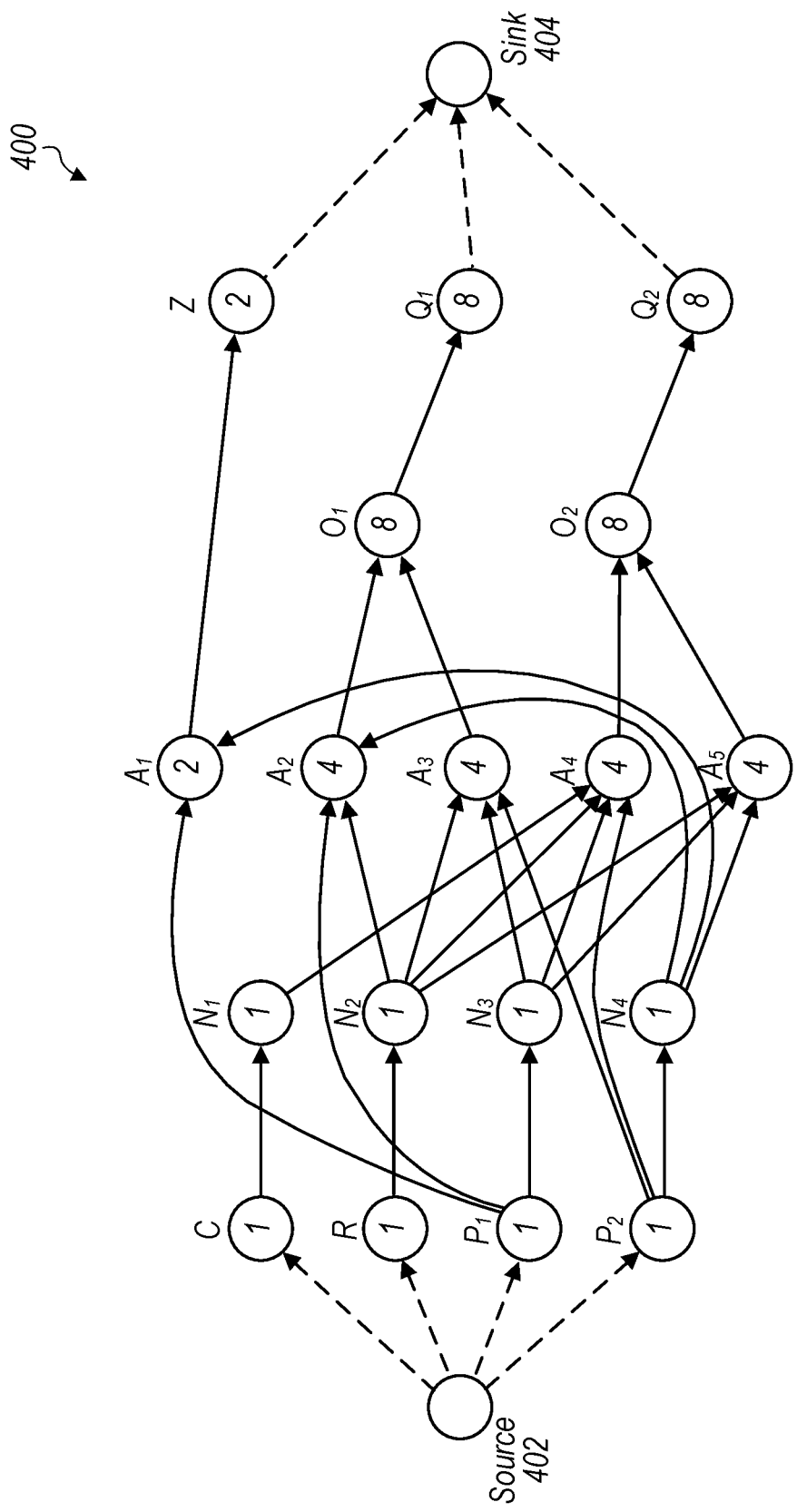
FIG. 4 depicts another example of a visualization of a decision blueprint, according to some embodiments.

FIG. 4 depicts another example of a visualization of a decision blueprint, according to some embodiments. Decision blueprint visualization 400, similarly to decision blueprint visualization 300, includes a plurality of circles interconnected by arrows between source 402 and sink 404. As with the example in FIG. 3, the circles in FIG. 4 represent locations where decision data needs to be loaded to execute rules and the letters above the circles represent conditions associated with the flow paths that are evaluated to control branching from the flow nodes. The numbers inside the circles represent values of data load time for the loading decision data associated with the circle and the arrows represent flow paths between the circles.

Returning to FIG. 1, decision service module 102 may implement data load module 110 to determine decision data to be loaded from decision data store module 114 in response to a transaction request received by the decision service module. In certain embodiments, data load module 110 requests to retrieve decision data from decision data store module 114 according to the decision blueprint provided by decision blueprint generation module 108. Decision data store module 114 may provide the requested decision data requested is provided to rule engine module 112 for execution by the rule engine, as described herein. In some embodiments, decision data store module 114 is a data store module located on transaction system 100. In some embodiments, decision data store module 114 is a data store accessed by a service call to the data store.

In certain embodiments, as shown in FIG. 1, data load module 110 accesses the decision blueprint in implementing the request to retrieve decision data according to the selected data load process. When the selected data load process is a full data load process, the full data load process, as described herein, includes loading decision data for all of the rules in the ruleapp as described by the information in the decision blueprint. No conditional evaluation of the decision blueprint is necessary for the full data load process (e.g., all data, or as much data as practicable within a time constraint, may simply be loaded). Thus, data load module 110 implements a full data load process by requesting decision data for all of the rules for the ruleapp being executed by rule engine module 112 from decision data store module 114.

When the selected data load process is a selective data load process, data load module 110 implements the selective data load process by determining a subset of decision data to load. Data load module 110 may determine the subset of decision data to load by conditionally evaluating all the flow paths described in the decision blueprint based on the input data received in the transaction request. For example, all possible flow paths may be conditionally evaluated to determine which flow paths have conditions that are satisfied or cannot be evaluated based on the input data. Based on these conditional evaluations of the flow paths, the rules present in the flow paths that have conditions that are satisfied or cannot be evaluated are identified as a subset of rules in the ruleapp that are to be implemented for the transaction request. The decision data associated with this subset of rules is then determined as the subset of decision data to be loaded for the transaction request. Data load module 110 may then request to retrieve the subset of decision data for the ruleapp being executed by rule engine module 112, as determined according to the selective data load process, from decision data store module 114.

Examples of Determining Decision Data to Load in Selected Data Load Process

As one example of a selective data load process, a decision blueprint based on decision blueprint visualization 300, shown in FIG. 3, may be conditionally evaluated by data load module 110 to determine the subset of decision data to request to be loaded for a transaction request. The conditional evaluations include evaluations of the conditions for the four circles with conditions—C, R, $P_1$, $P_2$—connected to source 302 with dashed arrows, which represent each of the four possible flow paths from the source. Evaluation of the conditions may include determining whether the conditions for each flow path are satisfied, not satisfied, or cannot be evaluated based on the input data in the transaction request. In this example, it is determined that the conditions "C" is not satisfied based on the input data in the transaction request while all other conditions are satisfied or cannot be evaluated based on the data in the transaction request. Thus, all flow paths that originate from condition "C" are marked as "false" while other flow paths are marked as "true".

With all flow paths that originate from condition "C" marked as false, from the possible flow paths in FIG. 3, the decision data that can be avoided from being loaded is decision data for the circle associated with condition "$N_1$". Thus, in this example, data load module 110 may determine, according to the selective data load process, that decision data for circles associated with all conditions except condition "$N_1$" are to be loaded from decision data store module 114 based on the input data in the transaction request.

As another example of a selective data load process, a decision blueprint based on decision blueprint visualization 400, shown in FIG. 4, may be conditionally evaluated by data load module 110 to determine the subset of decision data to request to be loaded for a transaction request. The conditional evaluations include evaluations of the conditions for the four circles with conditions—C, R, $P_1$, $P_2$—connected to source 402 with dashed arrows, which represent each of the four possible flow paths from the source. In this example, it is determined that the condition "C" is satisfied based on the input data in the transaction request while all other conditions are not satisfied. Thus, all flow paths that originate from condition "C" are marked as "true" while other flow paths are marked as "false".

With all flow paths that originate from condition "C" marked as true, from the possible flow paths in FIG. 4, it can be determined that the only decision data load needed is for the flow path—source-C-$N_1$-$A_4$-$O_2$-$Q_2$-sink, and all other decision data does not need to be loaded. Thus, in this example, data load module 110 may determine, according to the selective data load process, that decision data for circles associated with conditions C-$N_1$-$A_4$-$O_2$-$Q_2$ are to be loaded from decision data store module 114 based on the input data in the transaction request.

Returning to FIG. 1, in certain embodiments, decision data requested by data load module 110 (according to a full data load process or a selective data load process, as described above) is provided to rule engine module 112 from decision data store module 114 in response to the transaction request. Rule engine module 112 may receive the transaction request along with input data in the transaction request. Rule engine module 112 may access the ruleapp corresponding to the transaction request.

In certain embodiments, rule engine module 112 determines a decision on the transaction request by executing the rules in the ruleapp on the input data in the transaction request. Executing the rules in the ruleapp includes executing the rules with the requested decision data loaded into the rules. As described herein, the decision data loaded into the rules is the decision data received from decision data store module 114 according to the request from data load module 110, which determined the decision data load to request based on input data in the transaction request. Rule engine module 112 may output the decision on the transaction request (for example, return the decision to the requester or the provider of the transaction request), as shown in FIG. 1.

As described herein, decision service module 102 determines a selected data load process (e.g., either a full data load process or a selective data load process) to implement for each individual ruleapp implement in the decision service. Determining the selected data load process based on the individual ruleapp allows decision service module 102 to determine the data load process that provides the better utilization of resources in transaction system 100. In some embodiments, implementing the selected data load process provides a shorter decision data load time for retrieving the decision data from decision data store module 114. In some embodiments, implementing the selected data load process provides a better service-level agreement (SLA) between decision service module 102 and decision data store module 114.

Example Comparisons of Full Data Load Process Versus Selective Data Load Process Returning to the example of FIG. 3, described above, one example comparison of whether a full data load process or a selective data load process provides better resource utilization (e.g., better decision data load time) is provided. In the example of FIG. 3, the time needed for decision data load of rules associated with the circles is the sum of all numbers inside the circles or 60 ms. This total time is the total time for decision data load for rules that would be implemented in a full data load process. Alternatively, with all flow paths that originate from condition "C" marked as false, the decision data that can be avoided from being loaded is decision data for the circle associated with condition "$N_1$". With the decision data associated with "$N_1$" being avoided (which has a data load time of 1 ms), the total time needed for decision data load for rules that are implemented is 59 ms (or, conversely, the total time needed for decision data load for rules not implemented is 1 ms). This total time is the total time for decision data load for rules that would be implemented in a selective data load process.

In this example, the time needed for conditional evaluations of each flow path in the decision blueprint is also evaluated to determine whether a full data load process or a selective data load process provides better resource utilization. In decision blueprint visualization 300 in FIG. 3, there are 15 possible flow paths:
1. Source-C-$N_1$-$A_2$-$O_1$-$Q_1$-sink
2. Source-C-$N_1$-$A_4$-$O_2$-$Q_2$-sink
3. Source-C-$A_3$-$O_1$-$Q_1$-sink
4. Source-C-$A_5$-$O_2$-$Q_2$-sink
5. Source-R-$N_2$-$A_2$-$O_1$-$Q_1$-sink
6. Source-R-$N_2$-$A_3$-$O_1$-$Q_1$-sink
7. Source-$P_1$-$A_1$-Z-sink
8. Source-$P_1$-$A_2$-$O_1$-$Q_1$-sink
9. Source-$P_1$-$N_3$-$A_3$-$O_1$-$Q_1$-sink
10. Source-$P_1$-$N_3$-$A_4$-$O_2$-$Q_2$-sink
11. Source-$P_2$-$A_3$-$O_1$-$Q_1$-sink
12. Source-$P_2$-$A_4$-$O_2$-$Q_2$-sink
13. Source-$P_2$-$N_4$-$A_1$-Z-sink
14. Source-$P_2$-$N_4$-$A_2$-$O_1$-$Q_1$-sink
15. Source-$P_2$-$N_4$-$A_5$-$O_2$-$Q_2$-sink Based on the number of flow paths, a total time taken for conditional evaluation of all possible flow paths (assuming 1 ms per conditional evaluation) is 15×1 ms=15 ms. Thus, for the selective data load process, the total time to evaluate conditions for all possible flow paths and to load decision data for rules according to the selective data load process is 15 ms+59 ms=74 ms. Conversely, for the full data load process, no conditional evaluations are needed and only a full data load (60 ms) is implemented. Thus, for the full data load process, the total time to evaluate conditions for all possible flow paths and to load decision data for rules according to the full data load process is 0 ms+60 ms=60 ms. Based on a comparison of the total times (74 ms vs 60 ms), the full data load process may provide better data load times and better resource utilization.

Returning to the example of FIG. 4, described above, another example comparison of whether a full data load process or a selective data load process provides better resource utilization (e.g., better decision data load time) is provided. In the example of FIG. 4, the time needed for decision data load of rules associated with the circles is the sum of all numbers inside the circles or 60 ms. This total time is the total time for decision data load for rules that would be implemented in a full data load process. Alternatively, with all flow paths that originate from condition "C" marked as true, it can be determined that the only decision data load needed is for the flow path—source-C-$N_1$-$A_4$-$O_2$-$Q_2$-sink. Thus, the only decision data needed to be loaded is the decision data associated with circles corresponding to C, $N_1$, $A_4$, $O_2$, and $Q_2$ and the total time needed for decision data load for rules that are implemented is 22 ms (or, conversely, the total time needed for decision data load for rules not implemented is 38 ms). This total time is the total time for decision data load for rules that would be implemented in a selective data load process.

As with the previous example in FIG. 3, the time needed for conditional evaluations of each flow path in the decision blueprint is also evaluated to determine whether a full data load process or a selective data load process provides better resource utilization. In decision blueprint visualization 400 in FIG. 4, there are 12 possible flow paths:
1. Source-C-$N_1$-$A_4$-$O_2$-$Q_2$-sink
2. Source-R-$N_2$-$A_2$-$O_1$-$Q_1$-sink
3. Source-R-$N_2$-$A_3$-$O_1$-$Q_1$-sink
4. Source-$P_1$-$A_1$-Z-sink
5. Source-$P_1$-$A_2$-$O_1$-$Q_1$-sink
6. Source-$P_1$-$N_3$-$A_3$-$O_1$-$Q_1$-sink
7. Source-$P_1$-$N_3$-$A_4$-$O_2$-$Q_2$-sink
8. Source-$P_2$-$A_3$-$O_1$-$Q_1$-sink
9. Source-$P_2$-$A_4$-$O_2$-$Q_2$-sink
10. Source-$P_2$-$N_4$-$A_1$-Z-sink
11. Source-$P_2$-$N_4$-$A_2$-$O_1$-$Q_1$-sink
12. Source-$P_2$-$N_4$-$A_5$-$O_2$-$Q_2$-sink Based on the number of flow paths, a total time taken for conditional evaluation of all possible flow paths (assuming 1 ms per conditional evaluation) is 12×1 ms=12 ms. Thus, for the selective data load process, the total time to evaluate conditions for all possible flow paths and to load decision data for rules according to the selective data load process is 12 ms+22 ms=34 ms. Conversely, for the full data load process, no conditional evaluations are needed and only a full data load (60 ms) is implemented. Thus, for the full data load process, the total time to evaluate conditions for all possible flow paths and to load decision data for rules according to the full data load process is 0 ms+60 ms=60 ms. Based on a comparison of the total times (34 ms vs 60 ms), the selective data load process may provide better data load times and better resource utilization.

Example Methods

Figure 5:
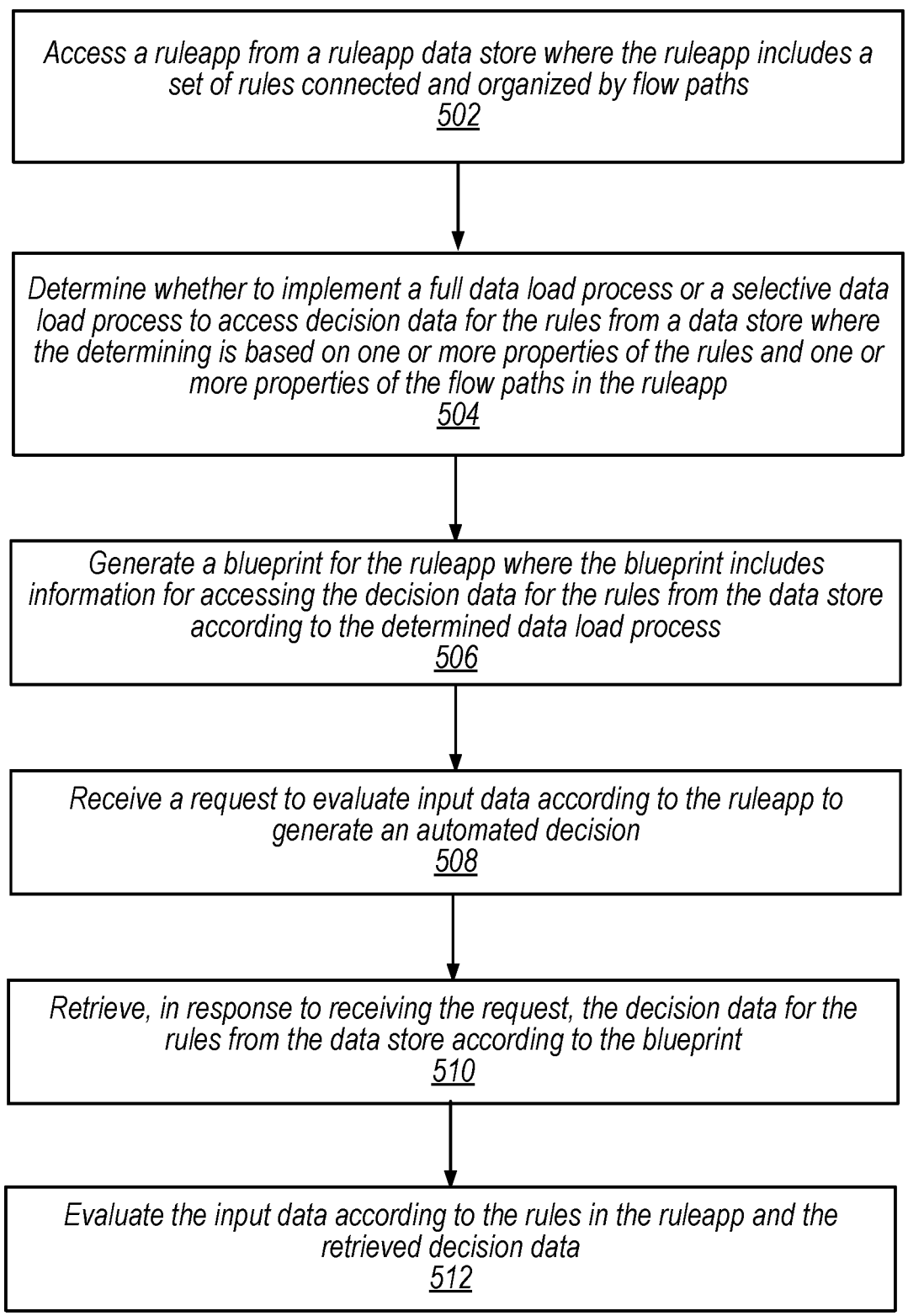
FIG. 5 is a flow diagram illustrating a method for determining a decision data load process, according to some embodiments.

FIG. 5 is a flow diagram illustrating a method for determining a decision data load process, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system.

At 502, in the illustrated embodiment, a computing system accesses a ruleapp from a ruleapp data store where the ruleapp includes a set of rules connected and organized by flow paths.

At 504, in the illustrated embodiment, the computing system determines whether to implement a full data load process or a selective data load process to access decision data for the rules from a data store where the determining is based on one or more properties of the rules and one or more properties of the flow paths in the ruleapp. In some embodiments, the determining whether to perform the full data load process or the selective data load process is based on a comparison between at least one property of the rules and at least one property of the flow paths. In some embodiments, the determining whether to perform the full data load process or the selective data load process is based on one or more properties of the computer system in addition to the one or more properties of the rules and one or more properties of the flow paths in the ruleapp. In some embodiments, the determining whether to perform the full data load process or the selective data load process includes comparing at least one property of the rules and the flow paths to at least one value determined by an owner of the ruleapp.

At 506, in the illustrated embodiment, the computing system generates a blueprint for the ruleapp where the blueprint includes information for accessing the decision data for the rules from the data store according to the determined data load process.

At 508, in the illustrated embodiment, the computing system receives a request to evaluate input data according to the ruleapp to generate an automated decision.

At 510, in the illustrated embodiment, the computing system retrieves, in response to receiving the request, the decision data for the rules from the data store according to the blueprint.

At 512, in the illustrated embodiment, the computing system evaluates the input data according to the rules in the ruleapp and the retrieved decision data. In some embodiments, the evaluating the input data according to the rules in the ruleapp and the retrieved decision data includes executing the rules in the ruleapp on the input data based on the retrieved decision data.

Figure 6:
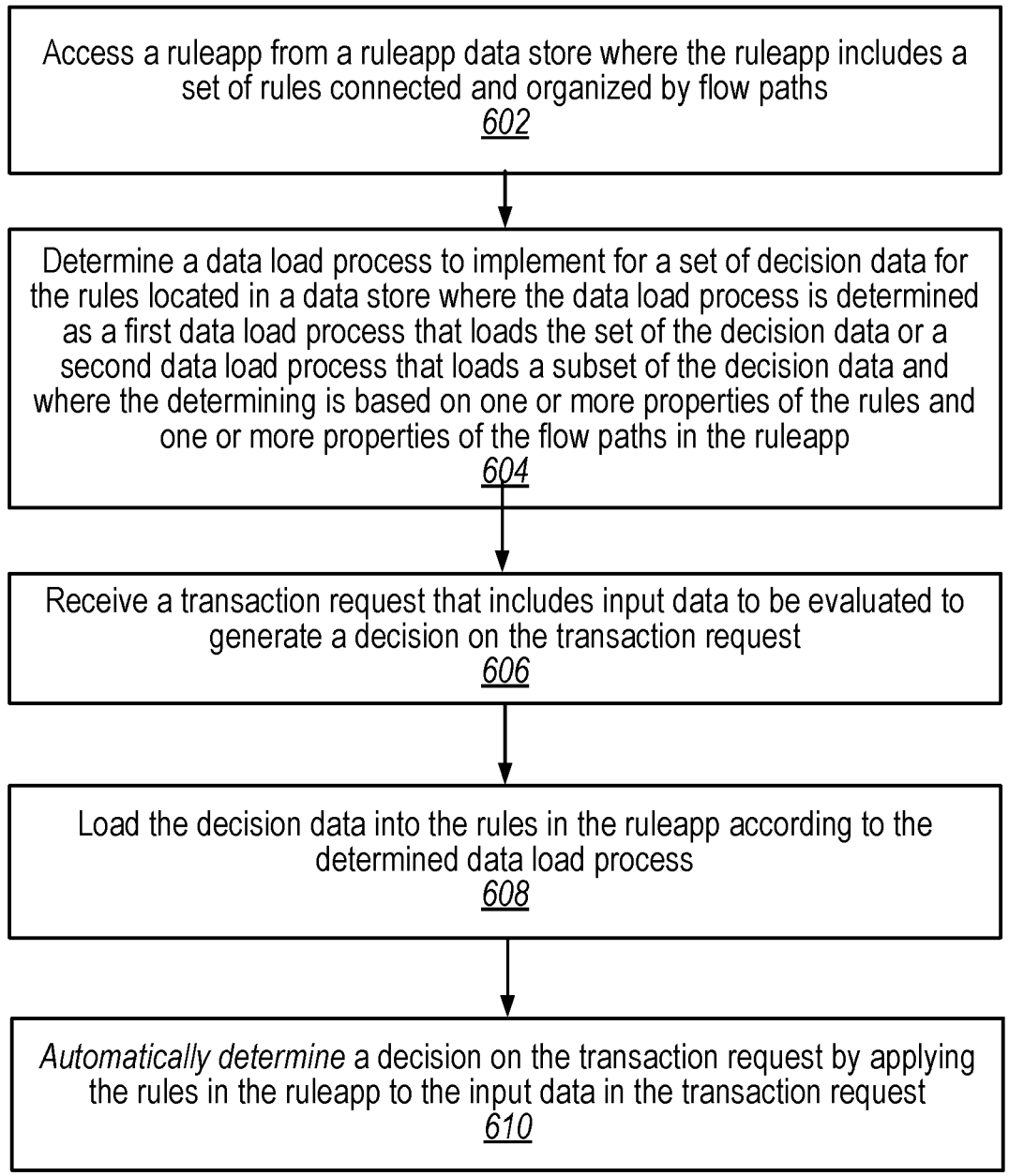
FIG. 6 is a flow diagram illustrating a method for determining a decision on a request, according to some embodiments.

FIG. 6 is a flow diagram illustrating a method for determining a decision on a request, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system.

At 602, in the illustrated embodiment, a computing system accesses a ruleapp from a ruleapp data store where the ruleapp includes a set of rules connected and organized by flow paths.

At 604, in the illustrated embodiment, the computing system determines a data load process to implement for a set of decision data for the rules located in a data store where the data load process is determined as a first data load process that loads the set of the decision data or a second data load process that loads a subset of the decision data and where the determining is based on one or more properties of the rules and one or more properties of the flow paths in the ruleapp.

In some embodiments, the first data load process includes loading all of the decision data in the set of decision data. In some embodiments, the second data load process includes generating information that describes each possible flow path in the ruleapp, conditions for evaluation of each flow path, rules associated with each flow path, and decision data associated with each rule. In some embodiments, loading the decision data into the rules in the ruleapp according to second data load process includes conditionally evaluating the flow paths in the generated information based on input data in the transaction request to determine the subset of the decision data to load for the rules in the ruleapp.

In some embodiments, conditionally evaluating the flow paths in the generated information based on the input data to determine the subset of the decision data includes: evaluating conditions on the flow paths in the generated information to determine whether the conditions on the flow paths are satisfied based on the input data; determining a subset of rules where the subset of rules includes the rules in the flow paths that are determined to have conditions that are satisfied based on the input data and the rules in the flow paths that cannot be evaluated based on the input data; and determining the subset of the decision data from the subset of rules.

In some embodiments, determining the data load process to implement for the set of the decision data for the rules located in the data store includes determining at least one property of the rules and at least one property of the flow paths and comparing the at least one property of the rules to the at least one property of the flow paths.

At 606, in the illustrated embodiment, the computing system receives a transaction request that includes input data to be evaluated to generate a decision on the transaction request.

At 608, in the illustrated embodiment, the computing system loads the decision data into the rules in the ruleapp according to the determined data load process.

At 610, in the illustrated embodiment, the computing system automatically determines a decision on the transaction request by applying the rules in the ruleapp to the input data in the transaction request. In some embodiments, automatically determining the decision on the transaction request includes loading the decision data into a rule engine according to the determined data load process and providing the input data to the rule engine and executing the rules using the loaded decision data.

Figure 7:
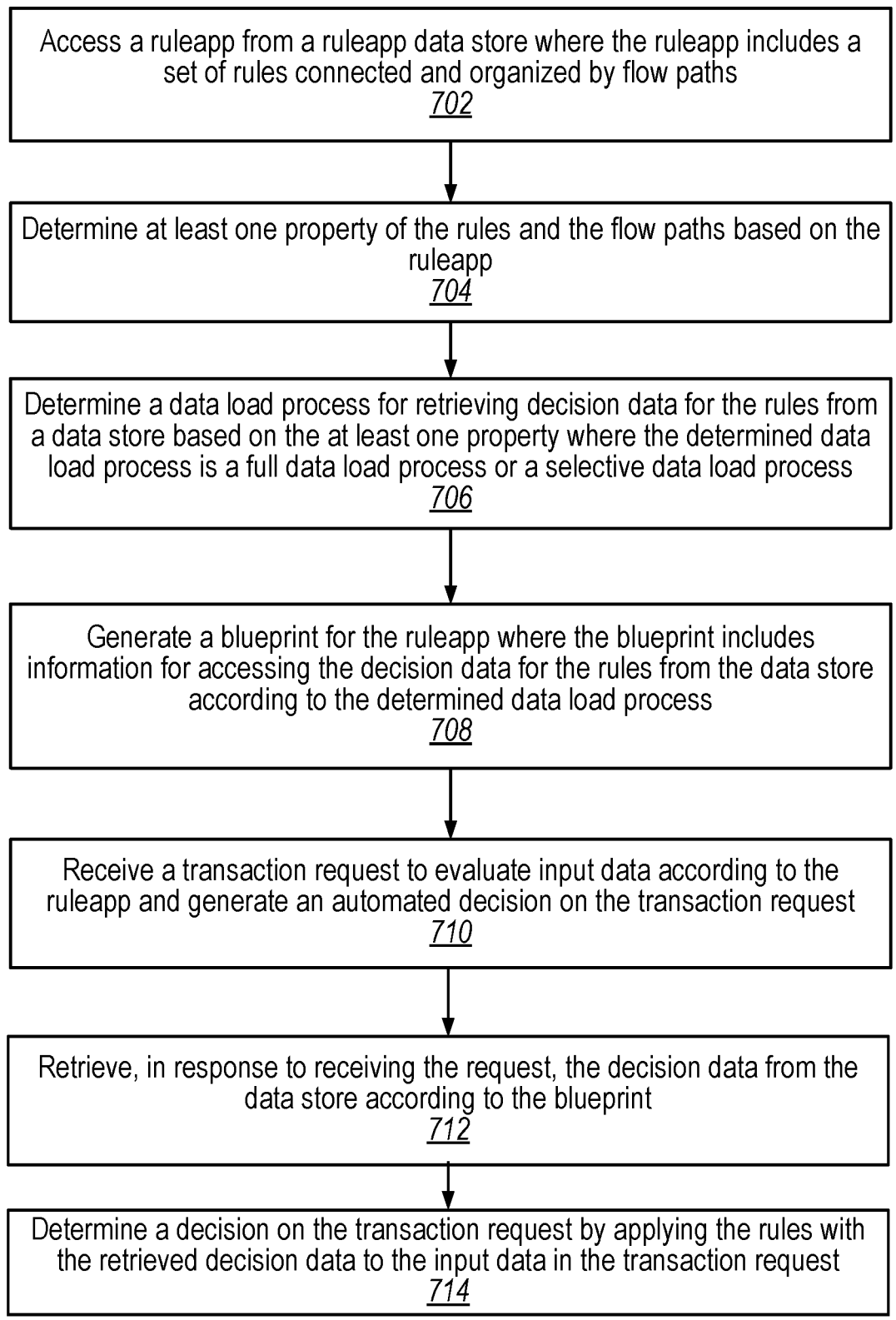
FIG. 7 is a flow diagram illustrating a determining a decision on a transaction request, according to some embodiments.

FIG. 7 is a flow diagram illustrating a determining a decision on a transaction request, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system.

At 702, in the illustrated embodiment, a computing system accesses a ruleapp from a ruleapp data store where the ruleapp includes a set of rules connected and organized by flow paths.

At 704, in the illustrated embodiment, the computing system determines at least one property of the rules and the flow paths based on the ruleapp.

At 706, in the illustrated embodiment, the computing system determines a data load process for retrieving decision data for the rules from a data store based on the at least one property where the determined data load process is a full data load process or a selective data load process. In some embodiments, determining the data load process based on the at least one property includes comparing the at least one property to at least one threshold. In some embodiments, the at least one threshold is determined by an owner of the decision service.

In some embodiments, determining the data load process includes determining which of the full data load process and the selective data load process provides a shorter load time for retrieving the decision data from the data store.

At 708, in the illustrated embodiment, the computing system generates a blueprint for the ruleapp where the blueprint includes information for accessing the decision data for the rules from the data store according to the determined data load process.

At 710, in the illustrated embodiment, the computing system receives a transaction request to evaluate input data according to the ruleapp and generate an automated decision on the transaction request.

At 712, in the illustrated embodiment, the computing system retrieves, in response to receiving the request, the decision data from the data store according to the blueprint.

At 714, in the illustrated embodiment, the computing system determines a decision on the transaction request by applying the rules with the retrieved decision data to the input data in the transaction request. In some embodiments, the decision on the transaction request includes a decision selected from the following decisions: a transaction risk decision, a transaction compliance decision, and a transaction limit decision.

Example Computer System

Figure 8:
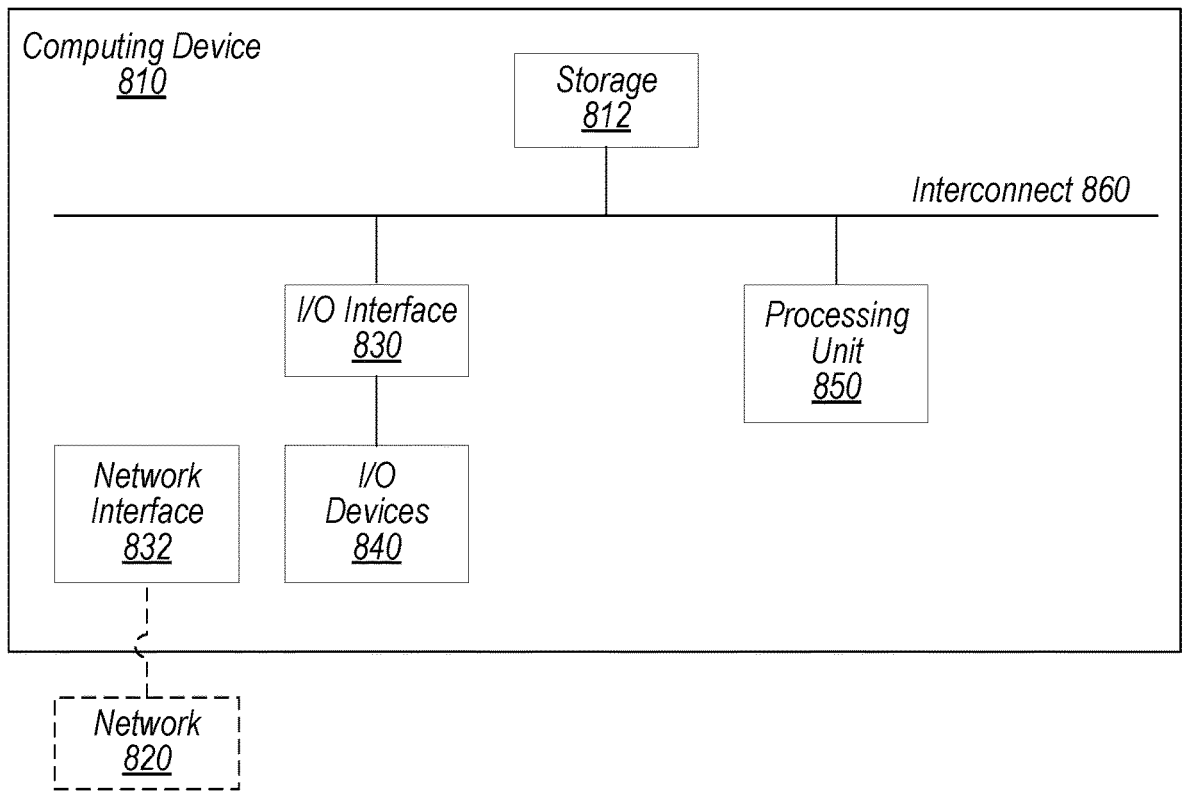
FIG. 8 is a block diagram of one embodiment of a computer system.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage subsystem 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   accessing, by a computer system, a ruleapp from a ruleapp data store, wherein the ruleapp includes data describing a set of rules connected and organized by flow paths;
   assessing, by the computer system, one or more properties of the rules in the ruleapp and one or more properties of the flow paths in the ruleapp based on the data describing the set of rules and flow paths in the ruleapp, at least one property of the rules being a total number of rules in the ruleapp and at least one property of the flow paths being a total number of flow paths in the ruleapp;
   determining, by the computer system, a selected data load process to implement for accessing decision data for the rules in the ruleapp from a data store in response to a request that invokes the ruleapp, wherein the selected data load process is determined to be either a full data load process or a selective data load process, and wherein the determining of the selected data load process being either the full data load process or the selective data load process is based on evaluation of the assessed properties of the rules in the ruleapp and the assessed properties of the flow paths in the ruleapp, the evaluation including evaluation of the total number of rules in the ruleapp and the total number of flow paths in the ruleapp;
   implementing the selected data load process in generating, by the computer system, a blueprint for accessing the decision data for the rules in the ruleapp, wherein the blueprint includes information for accessing the decision data for the rules in the ruleapp from the data store in accordance with the selected data load process;
   receiving, by the computer system, a request to evaluate input data according to the ruleapp to generate an automated decision;
   retrieving, by the computer system, in response to receiving the request, the decision data for the rules in the ruleapp from the data store according to the blueprint and the selected data load process; and
   evaluating, by the computer system, the input data according to the rules in the ruleapp and the retrieved decision data.

2. The method of claim 1, wherein the information in the blueprint for the full data load process includes information for accessing decision data from the data store for all of the rules in the ruleapp.

3. The method of claim 1, wherein the information in the blueprint for the selective data load process includes metadata that represents each possible flow path in the ruleapp, conditions for evaluation of each flow path, rules associated with each flow path, and decision data associated with each rule.

4. The method of claim 3, wherein the information in the blueprint for the selective data load process includes information for accessing decision data from the data store for a subset of the rules in the ruleapp, and wherein the subset of rules in the ruleapp is determined from a conditional evaluation of each flow path in the blueprint based on the input data.

5. The method of claim 1, wherein the determining whether to perform the full data load process or the selective data load process is based on a comparison between at least one property of the rules and at least one property of the flow paths.

6. The method of claim 1, wherein the determining whether to perform the full data load process or the selective data load process is based on one or more properties of the computer system in addition to the one or more properties of the rules and one or more properties of the flow paths in the ruleapp.

7. The method of claim 1, wherein the determining whether to perform the full data load process or the selective data load process includes comparing at least one property of the rules and the flow paths to at least one value determined by an owner of the ruleapp.

8. The method of claim 1, wherein evaluating the input data according to the rules in the ruleapp and the retrieved decision data includes:
   loading the retrieved decision data into the rules in the ruleapp; and
   executing the rules in the ruleapp using the input data and the loaded decision data.

9. A non-transitory computer-readable medium having instructions stored thereon that are executable by a computing device to perform operations, comprising:
   accessing a ruleapp from a ruleapp data store, wherein the ruleapp includes data describing a set of rules connected and organized by flow paths;
   assessing one or more properties of the rules in the ruleapp and one or more properties of the flow paths in the ruleapp based on the data describing the set of rules and flow paths in the ruleapp, at least one property of the rules being a total number of rules in the ruleapp and at least one property of the flow paths being a total number of flow paths in the ruleapp;
   determining a data load process to implement, in response to a request that invokes the ruleapp, for loading decision data into the rules from a set of decision data for the rules located in a data store, wherein the data load process is determined as a first data load process that loads the set of the decision data or a second data load process that loads a subset of the decision data, wherein the determining of the data load process being either the first data load process or the second data load process is based on evaluation of the assessed properties of the rules in the ruleapp and the assessed properties of the flow paths in the ruleapp, and wherein the assessed properties in the evaluation include at least the total number of rules in the ruleapp and the total number of flow paths in the ruleapp;
   receiving a transaction request that includes input data to be evaluated to generate a decision on the transaction request;

loading the decision data for evaluating the transaction request into the rules in the ruleapp from the data store in accordance with the determined data load process; and automatically determining a decision on the transaction request by applying the rules in the ruleapp with the loaded decision data to the input data in the transaction request.

10. The non-transitory computer-readable medium of claim 9, wherein the first data load process includes loading all of the decision data in the set of decision data.

11. The non-transitory computer-readable medium of claim 9, wherein the second data load process includes generating information that describes each possible flow path in the ruleapp, conditions for evaluation of each flow path, rules associated with each flow path, and decision data associated with each rule.

12. The non-transitory computer-readable medium of claim 11, wherein loading the decision data into the rules in the ruleapp according to second data load process includes conditionally evaluating the flow paths in the generated information based on input data in the transaction request to determine the subset of the decision data to load for the rules in the ruleapp.

13. The non-transitory computer-readable medium of claim 12, wherein conditionally evaluating the flow paths in the generated information based on the input data to determine the subset of the decision data includes:

evaluating conditions on the flow paths in the generated information to determine whether the conditions on the flow paths are satisfied based on the input data;

determining a subset of rules, wherein the subset of rules includes the rules in the flow paths that are determined to have conditions that are satisfied based on the input data and the rules in the flow paths that cannot be evaluated based on the input data; and determining the subset of the decision data from the subset of rules.

14. The non-transitory computer-readable medium of claim 9, wherein determining the data load process to implement for the set of the decision data for the rules located in the data store includes:

determining at least one property of the rules and at least one property of the flow paths; and comparing the at least one property of the rules to the at least one property of the flow paths.

15. The non-transitory computer-readable medium of claim 9, wherein automatically determining the decision on the transaction request includes:

loading the decision data into a rule engine according to the determined data load process; and providing the input data to the rule engine and executing the rules using the loaded decision data.

16. A method, comprising:

accessing, by a computer system, a ruleapp from a ruleapp data store, wherein the ruleapp includes data describing a set of rules connected and organized by flow paths;

assessing, by the computer system, one or more properties of the rules in the ruleapp and one or more properties of the flow paths in the ruleapp based on the data describing the set of rules and flow paths in the ruleapp, at least one property of the rules being a total number of rules in the ruleapp and at least one property of the flow paths being a total number of flow paths in the ruleapp;

determining, by the computer system, a selected data load process to implement for retrieving decision data for the rules in the ruleapp from a data store in response to a request that invokes the ruleapp, wherein the selected data load process is determined to be either a full data load process or a selective data load process, wherein the determining of the selected data load process being either the full data load process or the selective data load process is based on evaluation of the assessed properties of the rules in the ruleapp and the assessed properties of the flow paths in the ruleapp, and wherein the assessed properties that are evaluated include at least the total number of rules in the ruleapp and the total number of flow paths in the ruleapp;

implementing the selected data load process in generating, by the computer system, a blueprint for accessing the decision data for the rules in the ruleapp, wherein the blueprint includes information for accessing the decision data for the rules in the ruleapp from the data store in accordance with the selected data load process;

receiving, by the computer system, a transaction request to evaluate input data according to the ruleapp and generate an automated decision on the transaction request;

retrieving, by the computer system, in response to receiving the request, the decision data for the rules in the ruleapp from the data store according to the blueprint and the selected data load process; and determining, by the computer system, a decision on the transaction request by applying the rules with the retrieved decision data to the input data in the transaction request.

17. The method of claim 16, wherein determining the data load process based on the at least one property includes comparing the at least one property to at least one threshold.

18. The method of claim 17, wherein the at least one threshold is determined by an owner of the computer system determining the decision on the transaction request.

19. The method of claim 16, wherein the decision on the transaction request includes a decision selected from the following decisions: a transaction risk decision, a transaction compliance decision, and a transaction limit decision.

20. The method of claim 16, wherein determining the data load process includes determining which of the full data load process and the selective data load process provides a shorter load time for retrieving the decision data from the data store.

* * * * *